United States Patent

[11] 3,552,458

[72] Inventor John C. Whitman
 Port Byron, N.Y.
[21] Appl. No. 715,684
[22] Filed Mar. 25, 1968
[45] Patented Jan. 5, 1971
[73] Assignee Agway Inc.
 Syracuse, N.Y.
 a corporation of Delaware

[54] APPARATUS FOR DE-SHELLING HARD-COOKED EGGS
 3 Claims, 6 Drawing Figs.
[52] U.S. Cl. ................................................. 146/2
[51] Int. Cl. ........................................... A47g 19/28
[50] Field of Search ........................... 146/2, 2.4, 2.6, 221, 49, 50; 17/73, 74

[56] References Cited
UNITED STATES PATENTS

| | | | |
|---|---|---|---|
| 2,575,608 | 11/1951 | Williams, Sr. .............. | 146/2(.6) |
| 3,216,828 | 11/1965 | Koonz et al. ............... | 146/2(.6)UX |
| 2,529,286 | 11/1950 | Fraser ........................ | 146/49X |
| 2,535,980 | 12/1950 | Yeamans ..................... | 146/2(.6) |
| 2,608,716 | 9/1952 | Harris ......................... | 17/74X |
| 2,640,210 | 6/1953 | Zauner ........................ | 146/50X |

Primary Examiner—Willie G. Abercrombie
Attorney—D. Emmett Thompson

ABSTRACT: A hard-cooked egg deshelling mechanism including a shell cracking means, as a tumbling barrel arrangement, or compressor belt structure, and cracked shell removing means in the form of a pair of rotating resilient rolls along which the cracked eggs are advanced by a belt.

INVENTOR.
JOHN C. WHITMAN.
BY
D. Emmett Thompson
ATTORNEY.

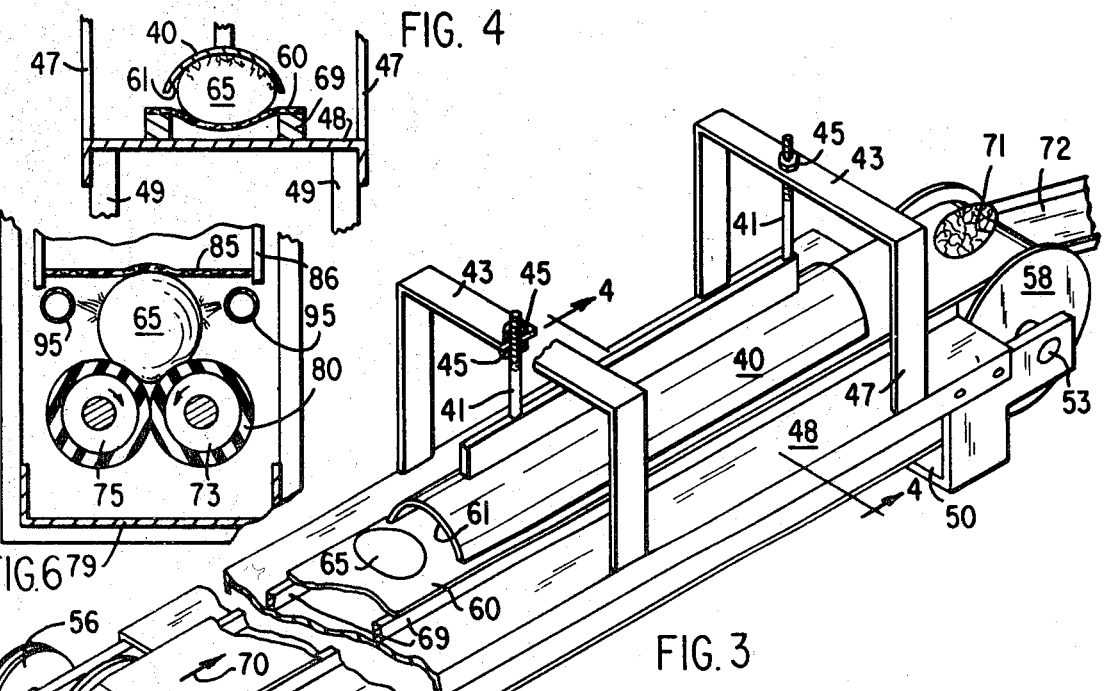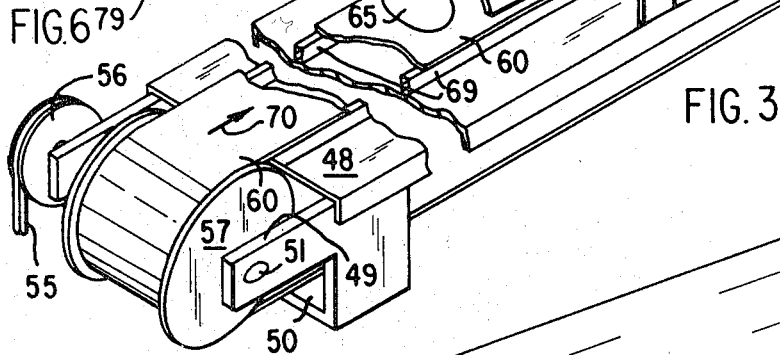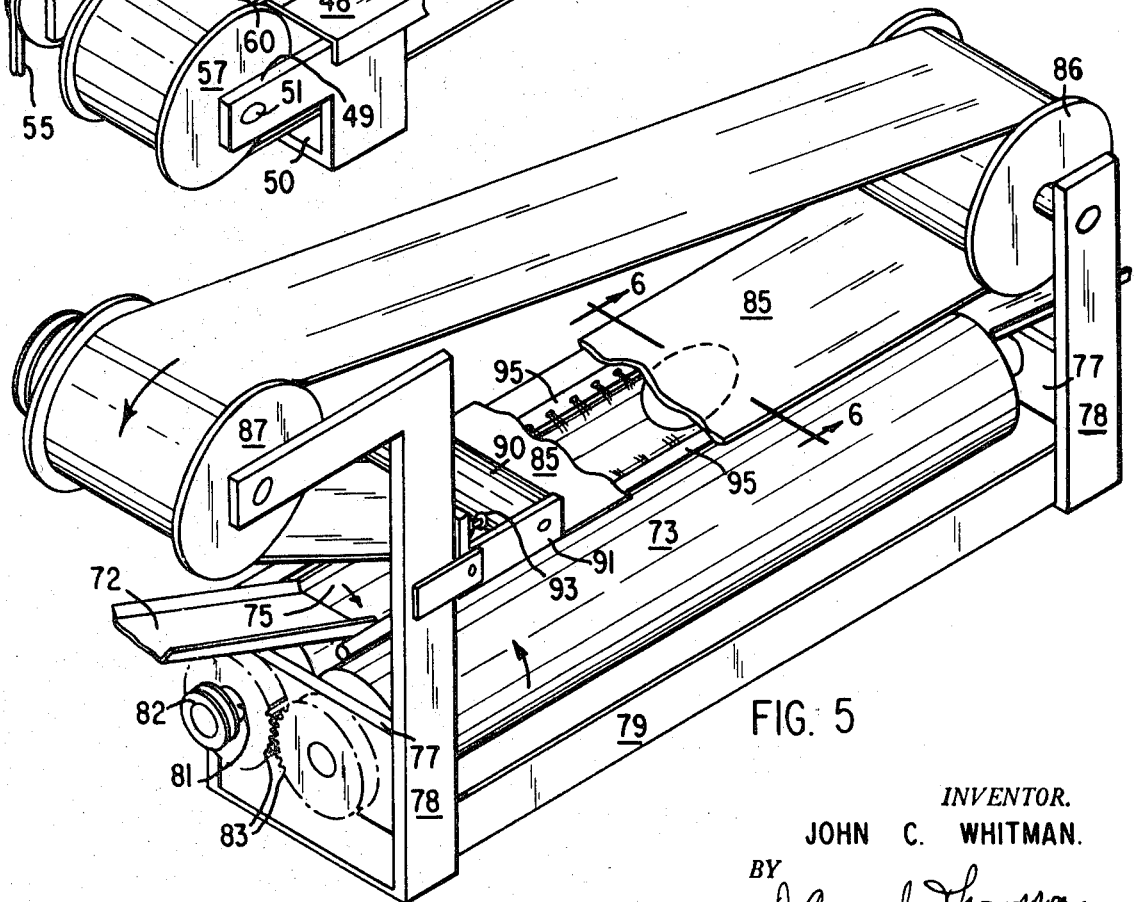

APPARATUS FOR DE-SHELLING HARD-COOKED EGGS

BACKGROUND OF THE INVENTION

A number of precooked and packaged egg products are now sold in substantial volume. Many of such products are made from eggs cooked hard in the shell. The removal of shells from the hard-cooked eggs by hand is a tedious and time consuming job, constituting a substantial part of the cost of producing the final egg product.

BRIEF SUMMARY OF THE INVENTION

This invention has as an object, apparatus for automatically removing the shells from hard-cooked eggs, and embodies a novel structural arrangement, leaving the egg meat substantially unbroken and in its original shape. The apparatus has high volume output.

The invention consists of means for cracking the shells of hard-cooked eggs over substantially the entire surface of the eggs and simultaneously loosening the shell membrane from the white of the egg. This portion of the apparatus may take the form of an inclined tumbling barrel structure. While the eggs are passing through the tumbling barrel, the tumbling of the eggs results in the cracking of the shells in relatively small pieces. The shells may also be cracked by rolling the eggs under compression between elongated members. One of such members may be of rigid form having a concave surface extending lengthwise thereof. The other member may be a belt which serves to roll the eggs along the concave surface and simultaneously apply sufficient pressure on the eggs to effect the cracking of the shells.

When the shells have been cracked, the cracked eggs are transferred to a shell removing mechanism. This mechanism consists of a pair of rolls having resilient coverings, the rolls extending in parallel proximity to support the eggs and rotated in opposite directions. The eggs are advanced along the rolls by a continuously running belt adjusted to maintain the eggs in frictional engagement with the rolls, which function to remove the pieces of cracked shells from the egg. Preferably, a water spray is employed to flush the pieces of shells from the rolls, which function to remove the pieces of cracked shells from the egg. Preferably, a water spray is employed to flush the pieces of shells from the rolls.

BRIEF DESCRIPTION OF DRAWINGS

FIG. 3 is a view, in perspective, with parts broken away illustrating another form of shell cracking mechanism.

FIG. 4 is a view taken on line 4–4, FIG. 3.

FIG. 5 is a view, in perspective, of the mechanism for removing the cracked shells from the eggs.

FIG. 6 is a view taken on line 6–6, FIG. 5.

DETAILED DESCRIPTION

Figure 1:
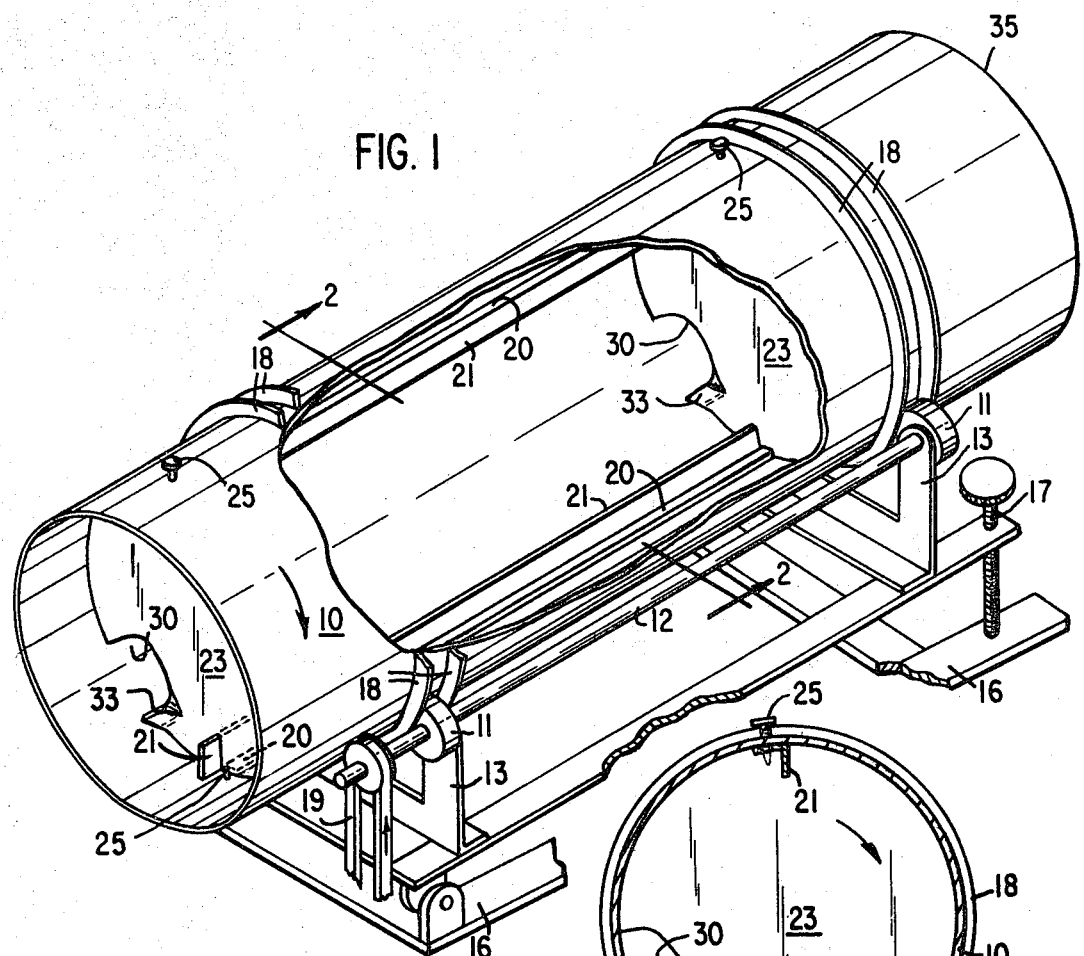
FIG. 1 is a view, in perspective, illustrating a tumbling barrel arrangement for cracking the egg shells.
Figure 2:
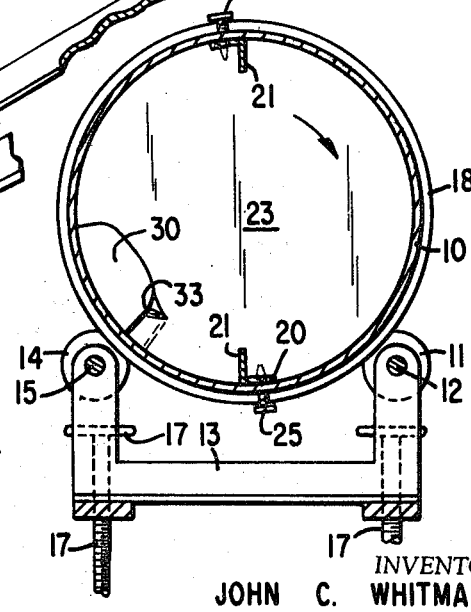
FIG. 2 is a view taken on line 2–2, FIG. 1.

In FIG. 1, a tubular member 10 is rotatably supported on a pair of rolls 11 fixed to a shaft 12 journaled in a frame 13. There are a similar pair of rolls 14 mounted on a shaft 15. The frame 13 is pivotally mounted at one end to a base 16. The opposite end of the frame is supported by screws 17 which may be adjusted to vary the inclination of the cylinder 10.

The tubular member 10 is provided with circumferentially extending spaced apart flanges 18 cooperable with the rolls 11, 14, to restrain the tubular member against axial movement. Rotation is imparted to the shaft 12 through a belt 19 operatively connected to a prime mover. There is affixed to the inner surface of the tubular member, rib members extending lengthwise thereof. These members are in the form of angle irons having their flanges 20 fixed to the inner surface of the tube 10, as by welding, and their flanges 21 extending radially inwardly from the inner surface of the tube. These members serve to effect a tumbling action to the hard-cooked eggs during rotation of the tube 10.

Partition members 23 are detachably mounted in the tube 10. The members 23 are in the form of discs having slots extending inwardly from their peripheries for admission of the extending ends of the flanges 21, the members 23 abutting against the flanges 20. The members 23 are detachably retained in the tube, as by screws 25, threading through the sidewall of the tube and arranged to engage and hold the partition members 23 seated against the flanges 20 of the rib members. This arrangement permits ready and convenient removal of the discs 23 for cleaning and sterilizing the discs and the cylinder 10.

Each partition disc 23 is formed with an opening or cutout 30 dimensioned to permit the free passage of an egg therethrough. The members 23 are formed on their downstream side with flanges 33 bent outwardly from the disc 23 at one side of the opening 30, the trailing outwardly bent flanges 33 facilitating the entry of the eggs into the openings 30.

In operation, the hard-cooked eggs are disposed into upper end portion 35 of the tumbling tube, the eggs successively passing through the opening 30 of the upper disc into the main portion of the tube and, upon rotation of the tube, the eggs are tumbled to effect cracking of the shells into small pieces. The eggs, with the shells cracked, pass through the opening 30 in the lower disc 23 for discharge to the shell removing mechanism.

The discs 23, with openings 30, serve to control the passage of eggs into and out of the tumbling tube 10 and accordingly, control the number of eggs being tumbled in the cylinder. The extent of shell cracking the eggs sustain is varied by the speed at which the cylinder revolves, the inclination of the cylinder and the number of partition discs employed. By varying these features, the shell cracking can be quite closely controlled.

In FIG. 3, a modified form of shell cracking mechanism is disclosed. In this arrangement, the hard-cooked eggs are rolled along a path between two members, the eggs being under compression. In this FIG., an elongated member 40 formed of rigid material is suspended by rods from cross members 43. The upper ends of the rods 41 are threaded to receive nuts 45, whereby the member 40 may be adjusted vertically to accommodate eggs of different size. The cross members 43 are supported by posts 47 extending upwardly from the side edged of a channel member 48 which, in turn, is supported by side rails 49 extending upwardly from a base plate 50.

A shaft 51 is journaled in like ends of the siderails 49, and a shaft 53 is journaled in the opposite ends of the side rails. The shaft 51 is rotated by a belt 55 operatively connected to a prime mover and trained over a pulley 56 secured to the shaft 51. Fixed to the shaft 51, intermediate the siderails 49, is a belt pulley 57. A second belt pulley 58 is mounted on the shaft 53. An endless belt 60 is trained over the pulley 57, 58, with the upper run of the belt extending beneath the elongated member 40 which is formed with a concave under surface 61. The spacing between the member 40 and the upper run of the belt 60 is such as to impart a rolling action to the eggs 65 and simultaneously effect compression of the eggs between the member 40 and the upper run of the belt. As the eggs are rolled along the member 40, the shells are cracked.

Due to the concave surface 61 of the member 40, the end portions of the eggshells are also cracked and to assure complete cracking of the shells over the entire surface of the egg, the upper run of the belt 60 is supported by rails 69 along which the edge margins of the belt move. The belt 60 is formed of flexible material, whereby the medial portion of the belt assumes a concave configuration which, in conjunction with the concave configuration of the member 40, results in the eggs being cracked throughout their surface by the member 40 and the belt 60. The upper run of the belt is moved to the right, FIG. 3, as indicated by the arrow 70. An egg, with the shell cracked, is indicated at 71 ready for discharge into the chute 72.

The cracked eggs are discharged into the chute 72 and directed to the shell removing mechanism which consists of a pair of rolls 73, 75. These rolls are journaled at their ends in cross members 77 extending between uprights 78 which are attached to a base structure 79. The rolls 73, 75, are each provided on their peripheries with resilient material 80. The rolls 73, 75, are rotated by a belt from a prime mover trained on pulley 82 fixed to shaft 81 on which roll 75 is mounted. Rotation in the opposite direction is imparted to roll 73 by gearing 83.

The eggs are advanced along the rolls 73, 75, by the lower run 85 of an endless belt trained over rolls 86, 87, journaled between the uprights 78. A tension roll 90 is journaled in a bracket 91, the roll 90 engaging the upper surface of the lower run 85 of the belt. The bracket is adjusted to vary the tension on the belt by screw 93.

The eggs, with the shells cracked and effectively loosened by the shell cracking mechanism, are advanced along the rolls 73, 75, while they are rotating, and the lower run 85 of the belt is adjusted to press the eggs lightly against the roll. The rotation of the rolls, in conjunction with the frictional properties of the resilient roll coverings 80, effectively strip the pieces of shell and the shell membrane from the egg meat. This action is improved by jets of water sprayed on the egg from pipes 95.

I claim:

1. Mechanism for removing the shells from hard-cooked eggs comprising a shell cracking means operable to advance a procession of hard-cooked eggs in the shell and simultaneously cracking the shells in small pieces and loosening the shell membrane from the egg white, and shell removing means operable during advancement of the cracked eggs to remove the pieces of cracked shell therefrom, said shell cracking means including an elongated fixed member having an under concave surface, a belt positioned in downwardly spaced relation to said surface and being movable lengthwise thereof, said belt being spaced from said concave surface to press the eggs thereagainst in shell cracking engagement therewith, while being rolled therealong by said belt.

2. Mechanism for removing the shells from hard-cooked eggs comprising a shell cracking means operable to advance a procession of hard-cooked eggs in the shell and simultaneously cracking the shells in small pieces and loosening the shell membrane from the egg white, shell removing means for removing the cracked shells from the eggs, said shell removing means including a pair of rolls having peripheral resilient surfaces, said rolls extending in closely spaced parallel relation and rotated about their axes in opposite directions, an endless belt having a lower run extending lengthwise of the rolls, said lower run being positioned above the rolls and operable to press the cracked eggs lightly against said rolls while advancing the eggs therealong, and means for directing fluid under pressure against opposite sides of the eggs while being advanced along said rolls.

3. An egg deshelling mechanism as set forth in claim 1 wherein said shell cracking means includes an elongated fixed member having an under concave surface, an endless flexible belt having a run spaced downwardly from said concave surface and being movable in a direction lengthwise thereof, a rigid belt supporting member extending lengthwise of said run at opposite sides of the belt and serving to support the marginal side portions of said run, the central area of said belt run being unsupported and spaced from said concave surface to press the eggs thereagainst in shell cracking engagement therewith while being rolled therealong by said belt.